(12) United States Patent
Okano et al.

(10) Patent No.: US 8,173,238 B2
(45) Date of Patent: May 8, 2012

(54) COMPOSITE SHAPED ARTICLE AND PROCESS FOR MANUFACTURING THE SAME

(75) Inventors: Yasutaka Okano, Otsu (JP); Yasunori Nagashima, Nagoya (JP); Hisashi Tebaka, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/677,387

(22) PCT Filed: Sep. 4, 2008

(86) PCT No.: PCT/JP2008/065939
§ 371 (c)(1),
(2), (4) Date: Mar. 10, 2010

(87) PCT Pub. No.: WO2009/034906
PCT Pub. Date: Mar. 19, 2009

(65) Prior Publication Data
US 2011/0008566 A1    Jan. 13, 2011

(30) Foreign Application Priority Data
Sep. 11, 2007    (JP) .................................. 2007-235036

(51) Int. Cl.
*B32B 3/14*    (2006.01)
(52) U.S. Cl. .......................................... 428/60; 428/58
(58) Field of Classification Search .................... 428/58, 428/60; 403/267
See application file for complete search history.

(56) References Cited

U.S. PATENT DOCUMENTS

| | | | |
|---|---|---|---|
| 3,811,141 A | 5/1974 | Stoeberl | |
| 5,486,329 A | 1/1996 | Ueki et al. | |
| 2003/0201570 A1 | 10/2003 | Sasatani | |
| 2006/0251847 A1* | 11/2006 | Hethcock et al. | 428/58 |
| 2009/0185340 A1 | 7/2009 | Ji et al. | |

FOREIGN PATENT DOCUMENTS

| | | |
|---|---|---|
| DE | 19842725 | 3/2000 |
| JP | 48-15017 Y1 | 4/1973 |
| JP | 159619/1987 | 10/1987 |
| JP | 4-305436 A | 10/1992 |
| JP | 5329880 | 12/1993 |
| JP | 2006-44259 A | 2/2006 |
| JP | 2007-38519 A | 2/2007 |

OTHER PUBLICATIONS

International Search Report dated Nov. 11, 2008, Application No. PCT/JP2008/065939.
European Search Report dated Feb. 14, 2011, application No. EP08830434.

* cited by examiner

*Primary Examiner* — Alexander Thomas
(74) *Attorney, Agent, or Firm* — RatnerPrestia

(57) ABSTRACT

A composite shaped article with uneven configuration junction face, comprising a resin member and a plate member composed of topside and underside arranged surface layer base materials integrated with a core layer base material interposed therebetween, the plate member and the resin member joined together with an uneven configuration at the side end faces facing each other. In the composite shaped article, the length of actual junction line formed along the unevenness of the uneven configuration is 1.05 mm or greater per mm of a protrusion passage line consisting of a continuity of line segment linking neighboring protrusion tops with each other in the uneven configuration drawn by the surface layer base materials.

16 Claims, 4 Drawing Sheets

COMPOSITE SHAPED ARTICLE AND PROCESS FOR MANUFACTURING THE SAME

This application is a U.S. National Phase Application of PCT International Application No. PCT/JP2008/065939, filed Sep. 4, 2008, which claims priority to Japanese Patent Application No. 2007-235036, filed Sep. 11, 2007, the contents of each of these applications being incorporated by reference herein in their entirety.

FIELD OF THE INVENTION

The present invention relates to a molded composite article and a production process thereof. A molded composite article according to one embodiment of the invention comprises a plate member and a resin member, wherein the plate member and the resin member are integrally bonded to each other at side end faces thereof facing each other. A molded composite article according to one embodiment of the invention can be preferably used as a material for forming parts of mobile electric and electronic devices such as portable personal computers and cell phones which are required to have a light weight, high strength, high stiffness and thin wall. A molded composite article according to one embodiment of the invention can be especially preferably used as a material for forming the housings of these devices.

BACKGROUND OF THE INVENTION

Electric and electronic devices such as personal computers and telephone sets are increasingly provided as mobile devices. The parts constituting these devices are required to have a small size, light weight and thin wall and such mechanical properties as high strength and high stiffness. It is especially necessary that the housings of these devices do not bend at least partially to contact inside parts for breaking the inside parts or to break themselves in the case where external loads act on the housings.

JP 2006-044259 A (Patent Literature 1) proposes a molded article for forming a housing. This molded article is an integrally molded article that uses a laminated member comprising numerous continuous reinforcing fibers arranged in one direction and a thermosetting resin (plate member) as a ceiling plate of the housing, wherein the ceiling plate is integrally bonded onto the top faces of the side frames formed of a thermoplastic resin including reinforcing fibers (resin member) of the housing by a thermoplastic resin composition (adhesive). This integrally molded article has an advantage that sufficient adhesion can be obtained between the ceiling plate and the side frames. However, the joints between the ceiling plate and the side frames are positioned on the top faces of the side frames, that is, the ceiling plate overlaps on the side frames, to form the joints. Therefore, the thickness of the ceiling plate at the joints prevents the housing from having a thin wall.

JP 2007-038519 A (Patent Literature 2) proposes a molded composite article for forming a housing. The molded composite article comprises a plate member and a resin member, wherein the plate member and the resin member are integrally bonded to each other at side end faces thereof facing each other. The plate member has a three-layer structure comprising an upper layer, a lower layer and a core layer positioned between the upper and lower layers. That is, in this case, the molded composite article has a sandwich structure in which the core layer is kept between the upper and lower layers. The core layer is a soft member (for example, a foamed material), and the upper and lower layers are hard members (for example, a resin including reinforcing fibers). This molded composite article is produced by injection-molding a resin forming the resin member toward a side end face of the plate member. The resin injected by the injection molding partially penetrates like a projection into the core layer from the side end face of the core layer, to bond the plate member and the resin member to each other.

This molded composite article is free from joint at which the plate member and the resin member overlap on each other, and the joint between both the members are positioned between side end faces of both the members, to allow the wall thickness of the housing to be reduced. However, in the case where the resin flowability is low during injection molding or in the case where a high injection pressure is not available, the projection-like penetration of the resin member into the core layer is insufficient, and it is difficult to obtain a sufficient bonding strength between the plate member and the resin member. Further, in this publicly known housing, the joint line between the side end face of the plate member and the side end face of the resin member are straight lines. Therefore, stress concentration is likely to occur at the joint, and for this reason, it is difficult to obtain a sufficient bonding strength.

As described above, there still remains a demand for a technique that allows a wall thickness of a housing to be reduced and that can achieve a sufficient bonding strength between both the members.

Patent Literature 1: JP 2006-044259 A
Patent Literature 2: JP 2007-038519 A

SUMMARY OF INVENTION

The invention provides a molded composite article having a light weight, high strength, high stiffness and thin wall. Further, the invention is intended to provide a molded composite article excellent in the bonding strength between a plate member and a resin member. The invention also provides a process for producing such a molded composite article.

A molded composite article according to an embodiment of the invention is as described below.

A molded composite article comprising a plate member and a resin member and having a bonding interface at which the plate member and the resin member are bonded to each other at side end faces thereof facing each other, in which the plate member comprises surface layer base materials positioned on the upper surface side and the lower surface side of the plate member and a core layer base material positioned between the both surface layer base materials; and the respective surface layer base materials are formed of a fiber-reinforced resin, while the core layer base material is formed of a soft material softer than the fiber-reinforced resin forming the respective surface layer base materials, wherein at least a partial bonding interface of the bonding interface is an undulating bonding interface at which undulating side end faces of the respective surface layer base materials and an undulating side end face of the resin member are bonded to each other; a length of an actual bonding line formed along an undulation of the undulating bonding interface is 1.05 mm or more per 1 mm length of a projection-connecting line consisting of straight line segments connecting crests of the respective projections adjacent to each other in an undulation form of the respective surface layer base materials; and at the undulating bonding interface, the resin member has a resin member penetrating tip portion that penetrates into a region between both the surface layer base materials.

In the molded composite article of an embodiment of the invention, it is preferred that at least at the undulating bonding interface, the side end face of the resin member is formed to be flat excluding the resin member penetrating tip portion.

In the molded composite article of an embodiment of the invention, it is preferred that at least at the undulating bonding interface, the thickness of the plate member is substantially equal to the thickness of the resin member.

In the molded composite article of an embodiment of the invention, it is preferred that the thickness of the plate member is 0.7 to 1.5 mm.

In the molded composite article of an embodiment of the invention, it is preferred that at the undulating bonding interface, the number of the projections in the undulation form of the respective surface layer base materials is 1 to 100 per 100 mm length of the projection-connecting line.

In the molded composite article of an embodiment of the invention, it is preferred that at the undulating bonding interface, if the distance from the projection-connecting line to a recess bottom of each of the recesses Pn in the undulation form of the respective surface layer base materials is a recess depth Ln, and the distance between both the ends of a recess opening line of the recess Pn formed as a line segment of the projection-connecting line within a form of the recess is a recess opening width Fn, then the recess depth Ln is 0.1 to 10 times the recess opening width Fn.

In the molded composite article of an embodiment of the invention, the recess Pn may contain a roundish line segment in the profile line of the recess form.

In the molded composite article of an embodiment of the invention, the recess Pn may have a portion wider than the recess opening width Fn.

In the molded composite article of an embodiment of the invention, the form of the recess Pn may also be substantially polygonal.

In the molded composite article of an embodiment of the invention, it is preferred that reinforcing fibers in the fiber-reinforced resin forming the respective surface layer base materials are carbon fibers.

In the molded composite article of an embodiment of the invention, it is preferred that a matrix resin in the fiber-reinforced resin forming the respective surface layer base materials is a resin containing a thermosetting resin.

In the molded composite article of an embodiment of the invention, it is preferred that the soft material forming the core layer base material is at least one material selected from the group consisting of foams, honeycomb materials, fiber sheets and resin sheets.

In the molded composite article of an embodiment of the invention, it is preferred that the resin member is formed of a fiber-reinforced resin.

In the molded composite article of an embodiment of the invention, it is preferred that reinforcing fibers in the fiber-reinforced resin forming the resin member are glass fibers or carbon fibers.

A process for producing a molded composite article according to one embodiment of the invention is as follows.

A process for producing a molded composite article according to one aspect of the invention comprises the steps of:
  (a) preparing a plate member having an undulation form formed at one side end face of a plate-like body comprising surface layer base materials formed of a fiber-reinforced resin and positioned on the upper surface side and the lower surface side and a core layer base material formed of a material softer than the fiber-reinforced resin and positioned between both the surface layer base materials, by forming multiple grooves at the end face inward into the surface layer base materials,
  (b) accommodating the prepared plate member in a mold of an injection molding machine, and
  (c) injecting a resin at least toward the end face having an undulation form of the plate member in the injection molding machine having the plate member accommodated in the mold, to ensure that the resin can be bonded to the end face having the undulation form of the plate member and that the resin can penetrate into a region between both the surface layer base materials.

In the process for producing a molded composite article in an embodiment of the invention, it is preferred that in the injecting step, the resin is injected to ensure that the thickness of the plate member and the thickness of the resin member can be substantially equal to each other after completion of molding at least at a joint having the undulation form between the plate member and the resin bonded thereto.

In aspects of a molded composite article according to the invention, a plate member and a resin member as components of the molded composite article are bonded to each other via an undulation form at least at a partial bonding interface of a bonding interface between the members. Therefore, the molded composite article can have a thinner wall, lighter weight, higher stiffness and higher strength. The molded composite article can be suitably used as members for forming housings of mobile electric and electronic devices such as portable personal computers and cell phones.

REFERENCE SIGNS LIST

Figure 1:
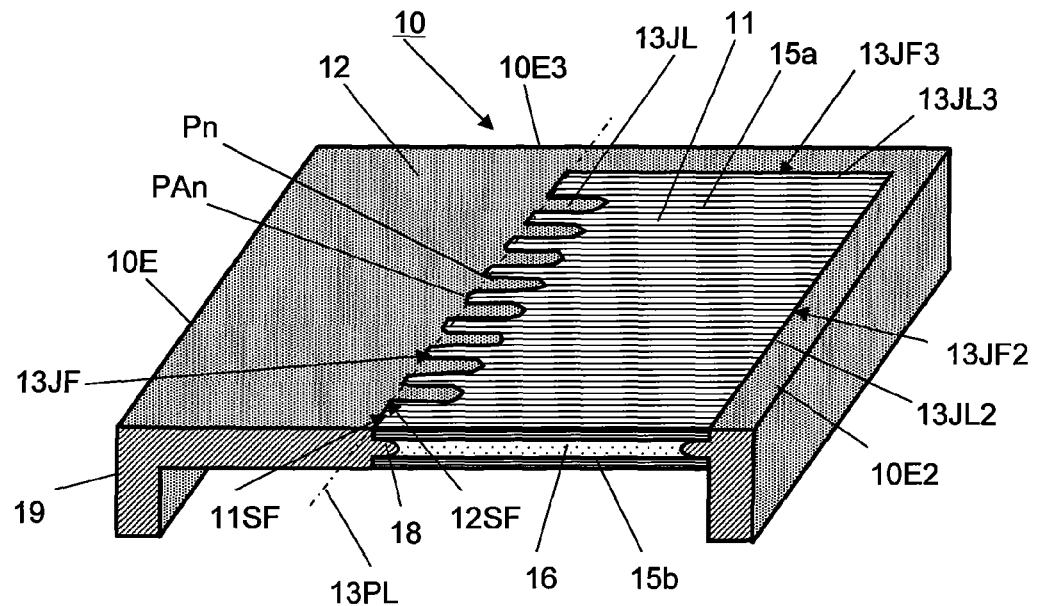
FIG. 1 is a perspective sectional view showing an embodiment of the molded composite article of the invention.

10: molded composite article of the invention
10E: left side edge
10E2: right side edge
10E3: upper side edge
11: plate member
11SF: side end face of plate member 11A: crude base material of plate member
11Aa, 11Ab, 11Ba, 11Bb: continuous reinforcing fiber sheet
12: resin member
12SF: side end face of resin member
13JF, 13JF2, 13JF3: bonding end face
13JL, 13JL2, 13JL3: bonding line
13PL: projection-connecting line
15a, 15b: surface layer base material
15aA: surface layer base material of upper surface side
15bA: surface layer base material of lower surface side
16: core layer base material
16A: core layer base material
18: tip portion of resin member
19: vertical wall of resin member
31Aa, 31Ab, 31Ba, 31Bb: continuous reinforcing fibers
40: conventional molded composite article
50: conventional molded composite article
101: plate member
101SF: side end face of plate member
101T: thickness of plate member
102: resin member
102SF: side end face of resin member
102T: thickness of resin member
103JF: bonding interface
103JL: bonding line
104SE1: one side of molded composite article
105a, 105b: surface layer base material
106: core layer base material
107: bonding projection
108: tip portion of resin member
Fn: recess opening width
JL: bonding line
Ln: recess depth
PAn: projection of surface layer base material
PL: projection-connecting line
Pn: recess of surface layer base material

DETAILED DESCRIPTION OF THE INVENTION

Embodiments of conventional molded composite articles and embodiments of molded composite articles according to the invention are explained below in reference to the drawings.

Figure 4:
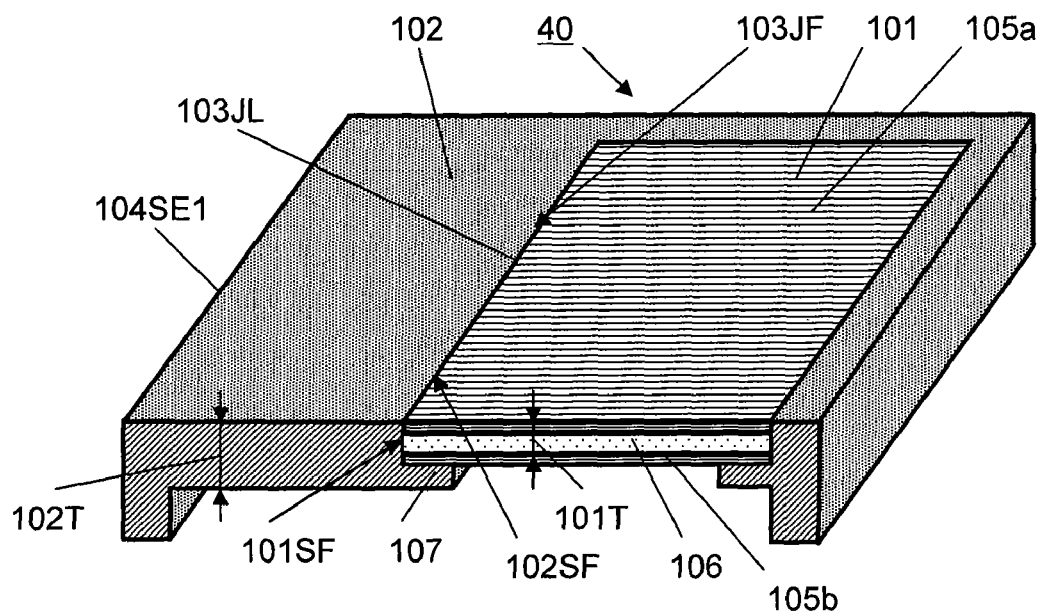
FIG. 4 is a perspective sectional view showing an example of the conventional molded composite article.
Figure 5:
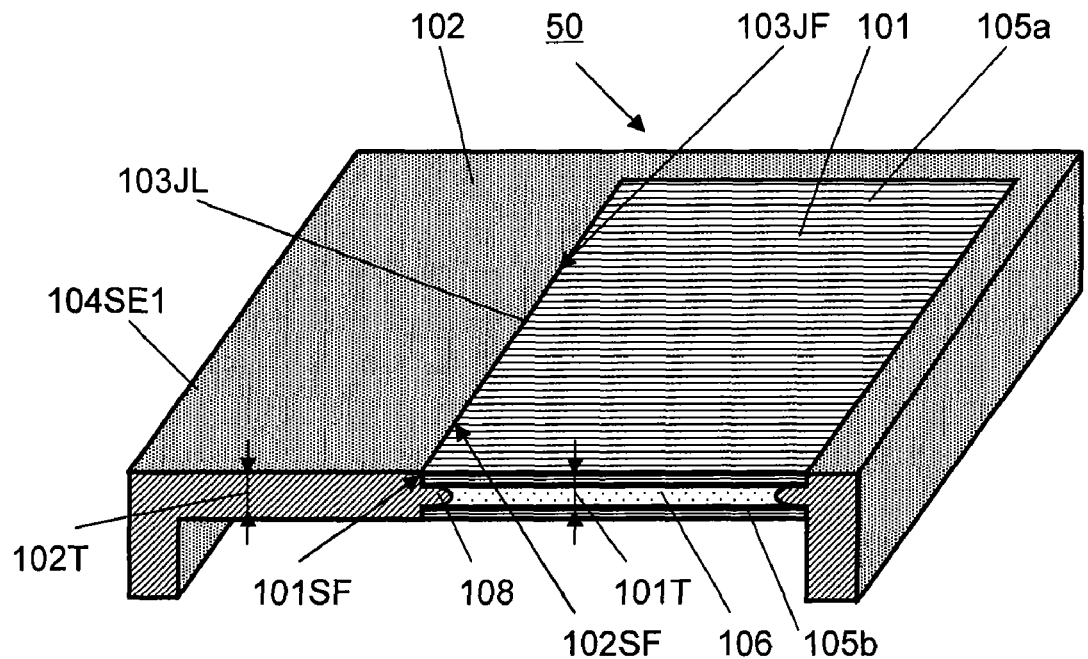
FIG. 5 is a perspective sectional view showing another example of the conventional molded composite article.

FIGS. 4 and 5 are perspective sectional views showing respectively different embodiments of the conventional molded composite articles. Since the embodiments are similar to each other, the same components are given the same symbols in FIGS. 4 and 5.

In FIGS. 4 and 5, a molded composite article 40 or 50 comprises a plate member 101 and a resin member 102. The plate member 101 and the resin member 102 are bonded to each other at a side end face 101SF of the plate member 101 and a side end face 102SF of the resin member 102 facing each other, to form a bonding interface 103JF. The bonding interface 103JF is shown as a bonding line 103JL on a surface of the molded composite article 40 or 50. The bonding line 103JL is a straight line. The direction of the straight line is usually in parallel to the direction of one side 104SE1 of the molded composite article 40 or 50. Owing to this constitution, in case of indicating a length on the bonding line 103JL, a wording of a parallel direction length may be used.

The plate member 101 comprises surface layer base materials 105a and 105b positioned on the upper surface side and the lower surface side, and a core layer base material 106 positioned between these surface layer base materials 105a and 105b. The respective surface layer base materials 105a and 105b are formed of a fiber-reinforced resin. The fiber-reinforced resin comprises numerous continuous reinforcing fibers arranged in one direction and a matrix resin. The core layer base material 106 is formed of a soft material softer than the fiber-reinforced resin forming the respective surface layer base materials 105a and 105b. As the soft material, foam is used. The soft material of the core layer base material 106 is used to ensure that when a resin for forming the resin member 102 is injection-molded toward the plate member 101, the resin for forming the resin member 102 can compress the core layer base material 106 and penetrate into a region between both the surface layer base materials 105a and 105b.

In the molded composite article 40 of FIG. 4, at the bonding interface 103JF, the side end face 102SF of the resin member 102 does not penetrate into the region between both the surface layer base materials 105a and 105b. As a result, for the purpose of reinforcing the bonding strength between the plate member 101 and the resin member 102 at the bonding interface 103JF, a bonding projection 107 for supporting the plate member 101 from below is provided for the side end face 102SF of the resin member 102 at the region of the bonding interface 103JF. For this reason, in the molded composite article 40, the thickness 102T of the resin member 102 is larger than the thickness 101T of the plate member 101. As a result, the molded composite article 40 is disadvantageous in view of weight reduction.

In the molded composite article 50 of FIG. 5, at the bonding interface 103JF, the side end face 102SF of the resin member 102 penetrates into a region between both the surface layer base materials 105a and 105b. The penetration of the resin member 102 causes a tip portion 108 of the resin member 102 to be positioned in a space formed by the core layer base material 106 receding in the penetration direction. That is, the tip portion 108 of the resin member 102 is positioned between both the surface layer base materials 105a and 105b. As a result, a certain bonding strength can be secured between the plate member 101 and the resin member 102 at the bonding interface 103JF. However, in the molded composite article 50, since the bonding line 103JL is a straight line, the penetration of the resin member 101 into the plate member 102 occurs only in the core layer base material 106, and it cannot be expected that the bonding strength between the plate member 101 and the resin member 102 is further enhanced.

An embodiment of the molded composite article of the invention is explained below in reference to FIGS. 1 and 2.

Figure 2:
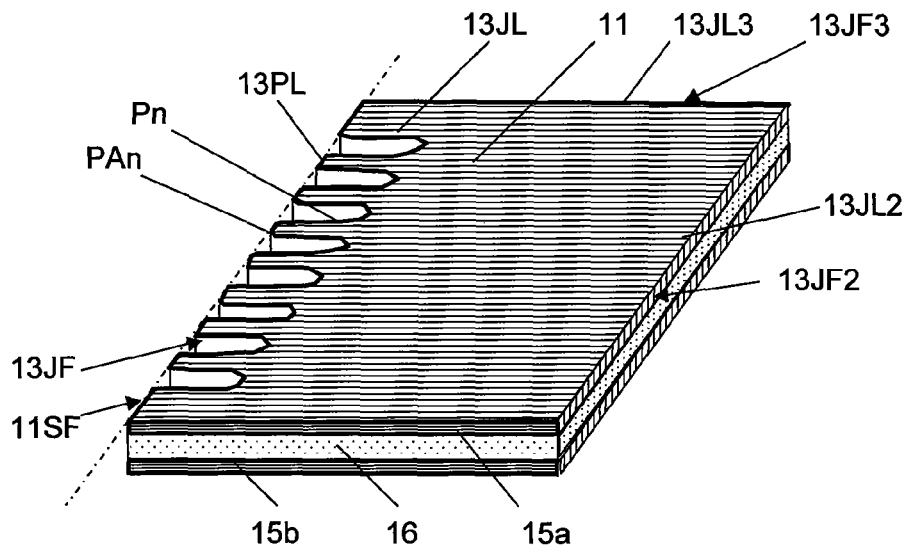
FIG. 2 is a perspective sectional view showing the plate member of the molded composite article shown in FIG. 1.

FIG. 1 is a perspective sectional view showing an embodiment of the molded composite article of the invention. FIG. 2 is a perspective sectional view showing the plate member used in the molded composite article of FIG. 1.

In FIG. 1, a molded composite article 10 of the invention comprises a plate member 11 and a resin member 12. The plate member 11 and the resin member 12 are bonded to each other between an undulating side end face 11 SF of the plate member 11 and an undulating side end face 12SF of the resin member 12 facing each other, to form a bonding interface 13JF as an undulating bonding interface. The bonding interface 13JF appears as a bonding line 13JL on a surface of the molded composite article 10. Since the bonding interface 13JF has an undulation form, the bonding line 13JL is an undulating curve.

The plate member 11 comprises a surface layer base material 15a positioned on the upper surface side, a surface layer base material 15b positioned on the lower surface side and a core layer base material 16 positioned between these surface layer base materials 15a and 15b. The respective surface layer base materials 15a and 15b are formed of a fiber-reinforced resin. The core layer base material 16 is formed of a soft material softer than the fiber-reinforced resin forming the respective surface layer base materials 15a and 15b. The soft material of the core layer base material 16 is used to ensure that when a resin for forming the resin member 12 is injection-molded toward the plate member 11, the resin for forming the resin member 12 can compress the core layer base material 16 and penetrate into a region between both the surface layer base materials 15a and 15b. That is, a tip portion 18 of the resin member 12 is positioned between both the surface layer base materials 15a and 15b of the plate member 11.

The molded composite article 10 has bonding interfaces 13JF2, 13JF3 and 13JF4 in addition to the bonding interface 13JF between the plate member 11 and the resin member 12. However, the bonding interface 13JF4 does not appear in FIG. 1, since FIG. 1 is a sectional view. The respective bonding interfaces appear as bonding lines 13JL2, 13JL3 and 13JL4 in addition to the bonding line 13JL on the surface of the molded composite article 10. However, the bonding line 13JL4 does not appear in FIG. 1, since FIG. 1 is a sectional view. The molded composite article 10 has a left side edge 10E, right side edge 10E2, upper side edge 10E3 and lower side edge 10E4 in FIG. 1. However, the lower side edge 10E4 does not appear in FIG. 1, since FIG. 1 is a sectional view.

The direction of the left side edge 10E and the direction of the right side edge 10E2 are parallel to each other, and further, the direction of the upper side edge 10E3 and the direction of the lower side edge 10E4 are parallel to each other. The direction of the bonding line 13JL2 and the direction of the right side edge 10E2 are parallel to each other, and the direction of the bonding line 13JL3 and the direction of the upper side edge 10E3 are parallel to each other. The direction of the bonding line 13JL4 and the direction of the lower side edge 10E4 are parallel to each other. The bonding line 13JL having an undulating form progresses with undulation and the progress direction is parallel to the direction of the left side edge 10E. Owing to this constitution, in case of indicating a length on the bonding line, a wording of a parallel direction length may be used.

In the molded composite article 10, a length JL of the actual bonding line formed along the undulation of the undulation form of the undulating bonding interface 13JF, i.e., a length of the bonding line 13JL is 1.05 mm or more per 1 mm length of a projection-connecting line 13PL consisting of straight line segments connecting crests of the respective projections adjacent to each other in the undulation form of the respective surface layer base materials 15a and 15b. This value indicates the degree of undulation.

The projection-connecting line 13PL is usually a straight line. Further, in the case where the projection-connecting line 13PL is a straight line, the direction of the projection-connecting line 13PL is usually the same as the direction of the left side edge 10E. That is, the projection-connecting line 13PL is a straight line parallel to the left side edge 10E. Since the bonding line 103JL of the molded composite article 40 shown in FIG. 4 or of the molded composite article 50 shown in FIG. 5 is not a curve of undulation, but a straight line, the length of the actual bonding line and the length of the bonding line 103JL are equal to each other.

In the molded composite article 10, since the bonding interface 13JF has such an undulation form, the bonding strength at the bonding interface is remarkably higher than that of the molded composite article 40 or 50 shown in FIG. 4 or 5 in which the bonding interface is a flat face. In the molded composite article 10, other bonding interfaces 13JF2, 13JF3 and 13JF4 can also be undulating bonding interfaces like the bonding interface 13JF as required.

The size of the core layer base material 16 formed of a soft material can also be adjusted to ensure that the side end face of the core layer base material 16 may be positioned somewhat inside compared with the positions of the side end faces of the respective surface layer base materials 15a and 15b. In this constitution, the size of the tip portion 18 of the resin member 12 can be adjusted in response to the softness of the core layer base material 16, the injection pressure and the resin used to form the resin member 12.

Figure 3:
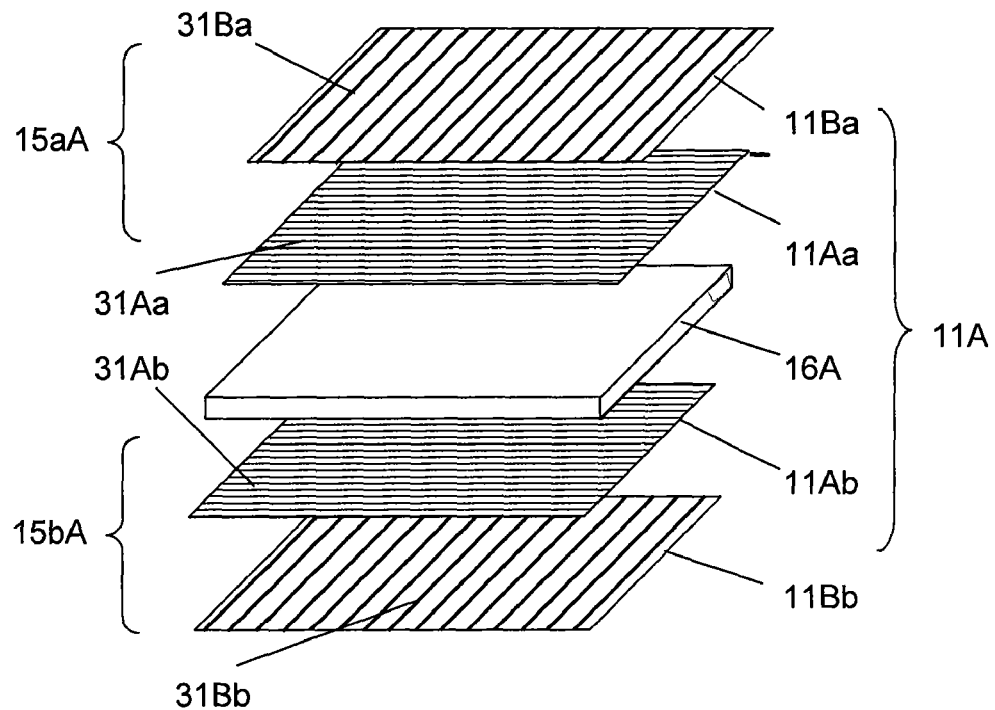
FIG. 3 is an exploded perspective view showing an example of plate-like base materials used for forming the plate member of the molded composite article shown in FIG. 1.

FIG. 3 is an exploded perspective view showing a crude laminate used to prepare the plate member 11 of the molded composite article 10 of FIG. 1. In FIG. 3, a crude laminate 11A comprises a core layer base material 16A formed of foam as a soft material, a continuous reinforcing fiber sheet 11Aa with numerous fibers arranged in parallel in one direction disposed on the upper surface of the core layer base material 16A, a continuous reinforcing fiber sheet 11Ab with numerous fibers arranged in parallel in one direction disposed on the lower surface of the core layer base material 16A, a continuous reinforcing fiber sheet 11Ba with numerous fibers arranged in parallel in one direction disposed on the upper surface of the continuous reinforcing fiber sheet 11Aa, and furthermore a continuous reinforcing fiber sheet 11Bb with numerous fibers arranged in parallel in one direction disposed on the lower surface of the continuous reinforcing fiber sheet 11Ab.

The direction in which continuous reinforcing fibers 31Aa are arranged in the continuous reinforcing fiber sheet 11Aa is perpendicular to the direction in which continuous reinforcing fibers 31Ba are arranged in the continuous reinforcing fiber sheet 11Ba. These continuous reinforcing fiber sheets form a surface layer base material 15aA on the upper surface side. Further, the direction in which continuous reinforcing fibers 31Ab are arranged in the continuous reinforcing fiber sheet 11Ab is perpendicular to the direction in which continuous reinforcing fibers 31Bb are arranged in the continuous reinforcing fiber sheet 31Bb. These continuous reinforcing fiber sheets form a surface layer base material 15bA on the lower surface side.

The method for bonding both the surface layer base materials 15aA and 15bA to the core layer base material 16A is not especially limited. For example, a method of holding an adhesive nonwoven fabric or film between each of both the surface layer base materials 15aA and 15bA and the core layer base material 16A and press-molding can be suitably used. Otherwise, for example, a method of applying an adhesive between each of both the surface layer base materials 15aA and 15bA and the core layer base material 16A can also be used.

The method for producing the plate member 11 using the crude laminate 11A of the plate member is not especially limited. For example, a press molding method, hand lay-up molding method, spray-up molding method, vacuum bag molding method, pressure molding method, autoclave molding method, transfer molding method, etc. respectively using a thermosetting resin can be used. Furthermore, for example, a press molding method or stamping method respectively using a thermoplastic resin can also be used. Above all, in view of processability and mechanical properties, a vacuum bag molding method, press molding method and transfer molding method can be suitably used.

The method for bonding the resin member 12 to the plate member 11 is not especially limited. However, a method comprising the steps of setting the plate member 11 in a mold of an injection molding machine, clamping the mold and injection-molding a resin for forming the resin member 12 can be suitably used. Otherwise, for example, a method of preparing the plate member 11 and the resin member 12 respectively separately and bonding them to each other using an adhesive can also be used.

In the molded composite article 10, the length of the bonding line 13JL is 1.05 mm or more per 1 mm length of the projection-connecting line 13PL consisting of straight line segments connecting the crests of the respective projections adjacent to each other in the undulation form of the respective surface layer base materials 15a and 15b. In the case where the length of the bonding line 13JL is 1.05 mm or more per 1 mm length of the projection-connecting line 13PL at the bonding interface 13JF, the load acting on the bonding interface 13JF, if any, can be dispersed to remarkably enhance the bonding strength compared with the case where the length of the bonding line 13JL is less than 1.05 mm.

It is preferred that the length of the bonding line 13JL per 1 mm length of the projection-connecting line 13PL is 1.10 mm or more, and more preferred is 1.15 mm or more. Meanwhile, if the length of the bonding line 13JL is longer, the bonding strength tends to be higher. However, even if the length is elongated to more than required, there is a limit to the enhancement of bonding strength and the processing of the plate member or the processing of the respective surface layer base materials becomes difficult. Considering these matters, it is preferred that the length of the bonding line 13JL per 1 mm length of the projection-connecting line 13PL is 5 mm or less. More preferred is 4 mm or less.

The method for preparing the undulation form at the side end face 11SF of the plate member or the respective surface layer base materials is not especially limited. However, a numerically controlled end mill or milling cutter or the like can be used for processing even a complicated undulation form.

It is preferred that the number of projections PAn in the undulation form of the respective surface layer base materials 15a and 15b at the bonding interface 13JF is 1 to 100 per 100 mm length of the projection-connecting line 13PL. In this case, if the distance from the projection-connecting line 13PL to the recess bottom of each recess Pn formed between the respectively adjacent projections is a recess depth Ln, it is preferred that the recess depth Ln is 0.5 to 100 mm.

It is more preferred that the number of projections PAn is 3 to 80 per 100 mm length of the projection-connecting line 13PL. In this case, it is more preferred that the recess depth Ln is 1 to 80 mm.

It is further more preferred that the number of projections PAn is 5 to 60 per 100 mm length of the projection-connecting line 13PL. In this case, it is further more preferred that the recess depth Ln is 2 to 60 mm.

If the number of projections PAn is less than 1 per 100 mm length of the projection-connecting line 13PL and the recess depth Ln is less than 0.5 mm, then in the case where the bonding length is short and where a load acts on the bonding interface 13JF, the bonding strength may be insufficient since the load cannot be dispersed. Further, if the number of projections PAn is more than 100 per 100 mm length of the projection-connecting line 13PL and the recess depth Ln is more than 100 mm, it may be difficult to process the plate member 11 or the surface layer base materials 15a and 15b, or processing time and cost may increase.

FIGS. 6 through 9 are plan views showing some undulating bonding interfaces with respectively different undulations to be formed at the side end faces of the surface layer base materials. In FIGS. 6 through 9, symbol JL denotes a bonding line at which the resin member bonds. Symbol PAn and Symbol PAn+1 denote projections adjacent to each other. Symbol Pn denotes a recess formed between the projections PAn and PAn+1 adjacent to each other. Symbol PL denotes the projection-connecting line consisting of straight line segments connecting the crests of the projections PAn and PAn+1 respectively adjacent to each other. Symbol Ln denotes the distance from the projection-connecting line PL to the recess bottom of each recess Pn, i.e., recess depth. Symbol Fn is the distance between both the ends of the recess opening line formed as a line segment of the projection-connecting line PL within the form of each recess Pn, i.e., the recess opening width.

It is preferred that the recess depth Ln is 0.1 to 10 times the recess opening width Fn. A more preferred range is 0.5 to 8 times, and a further more preferred range is 1 to 5 times. If the recess depth Ln is less than 0.1 time the recess opening width Fn, the bonding strength may be insufficient since the load is unlikely to be dispersed in the case where the load in parallel to the bonding interface acts on the bonding interface. Meanwhile, it is assumed that the abovementioned relationship between the recess depth Ln and the recess opening width Fn is satisfied by at least 90% or more of all the number N (n=1, 2, 3, ... N) of projections.

It is preferred that the profile line of the recess form of each recess Pn partially contains a roundish line segment. If each recess Pn contains a roundish line segment, the length of the actual bonding line JL can be elongated, and the stress concentration likely to occur in the case where there is a sharp portion can be prevented.

Each recess Pn may have a portion wider than the recess opening width Fn. In the case of the recess Pn shown in FIG. 9, the right bonding line segment JL and the left bonding line segment JL of the recess Pn become distant from each other as they extend toward the bottom of the recess Pn. That is, the recess Pn of FIG. 9 has a portion wider than the recess opening width Fn. If the recess Pn has a portion wider than the recess opening width Fn, in the case where a tensile force acts in the direction perpendicular to the bonding interface JF, an anchor effect can be enlarged.

Figure 10:
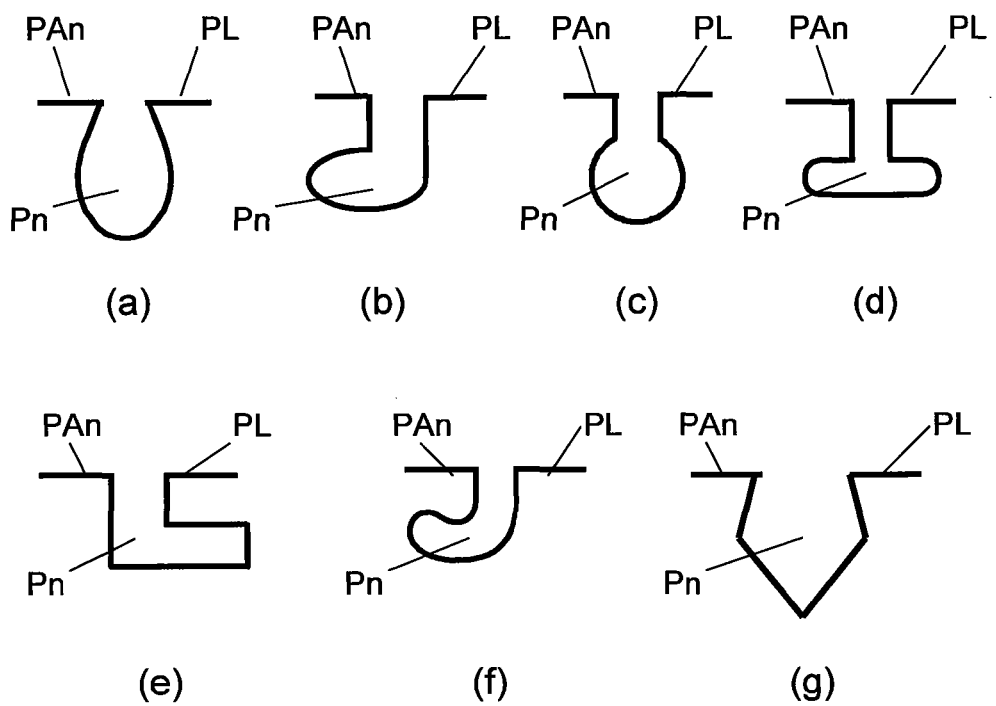
FIG. 10 is plan views showing seven form examples of each recess in the undulating bonding interface of the molded composite article of the invention.

Plan views of other seven examples of the recess Pn having a portion wider than the recess opening width Fn are shown in FIG. 10(a) through (g). The form of the recess Pn of FIG. 10(a) is a liquid drop form. The form of the recess Pn of FIG. 10(b) is a musical note form. The form of the recess Pn of FIG. 10(c) is a pendulum form. The form of the recess Pn of FIG. 10(d) is a dovetail groove form or T letter form. The form of the recess Pn of FIG. 10(e) is key-like form or L letter form. The form of the recess Pn of FIG. 10(f) is a tail form or J letter form. The form of the recess Pn of FIG. 10(g) is a polygonal form typified by a diamond or kite.

The surface layer base materials 15a and 15b of the plate member 11 are formed of a fiber-reinforced resin, and a resin used therein, i.e., a matrix resin is a thermoplastic resin or thermosetting resin.

Examples of the thermoplastic resin include polyolefins such as polyethylene (PE), polypropylene (PP) and polybutylene, styrene-based resins such as polystyrene (PS), acrylonitrile-butadiene-styrene copolymer (ABS) and acrylonitrile-styrene copolymer (AS), polyesters such as polyethylene terephthalate (PET), polybutylene terephthalate (PBT), polytrimethylene terephthalate (PTT), polyethylene naphthalate (PEN) and liquid crystal polyesters, polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, thermoplastic polyimide (PI), polyamideimide (PAI), polyetherimide (PEI), polysulfone (PSU), modified PSU, polyethersulfone (PES), polyketone (PK), polyetherketone (PEK), polyetheretherketone (PEEK), polyether ketone ketone (PEKK), polyarylate (PAR), polyether nitrile (PEN), thermoplastic phenol-based resins, phenoxy resin, fluorine resins such as polytetrafluoroethylene (PTFE), further, polystyrene-based, polyolefin-based, polyurethane-based, polyester-based, polyamide-based, polybutadiene-based, polyisoprene-based and fluorine-based thermoplastic elastomers, copolymers and modification products thereof, blends and polymer alloys comprising two or more of the foregoing, etc.

Examples of the thermosetting resin include unsaturated polyester, vinyl ester, epoxy, phenol (resol type), urea-melamine, polyimide, etc., copolymers and modification products thereof, and polymer alloys consisting of at least two of the foregoing.

As the matrix resin, a thermosetting resin excellent in stiffness and strength is preferred, and a thermosetting resin mainly composed of an epoxy resin is more preferred in view of the mechanical properties of the molded article. For further higher impact resistance, a thermoplastic resin and/or any other elastomer or rubber component can also be added to the thermosetting resin.

Examples of the reinforcing fibers used include inorganic fibers, for example, metal fibers such as aluminum fibers, brass fibers and stainless steel fibers, carbon fibers such as polyacrylonitrile-based, rayon-based, lignin-based and pitch-based carbon fibers, graphite fibers, glass fibers, silicon carbide fibers and silicon nitride fibers, and organic fibers such as aramid fibers, polypara-phenylene-benzobisoxazole (PBO) fibers, polyphenylene sulfide fibers, polyester fibers, acrylic fibers, nylon fibers and polyethylene fibers. Any one type of these reinforcing fibers can be used or two or more types can also be used together.

In view of the balance among specific strength, specific stiffness and light weight, carbon fibers are preferred as the reinforcing fibers, and in view of excellent specific strength and specific modulus, it is preferred to contain at least polyacrylonitrile-based carbon fibers.

The reinforcing fibers of the respective surface layer base materials 15a and 15b can also be a reinforcing fiber sheet comprising multiple layers containing reinforcing fibers. It is preferred that the reinforcing fibers are continuous reinforcing fibers, since higher strength and higher stiffness can be obtained. The length of the continuous reinforcing fibers in a reinforcing fiber sheet containing the continuous reinforcing fibers is only required to be 10 mm or more. However, it is not necessarily required that the reinforcing fibers are continuous throughout the entire reinforcing fiber sheet and can also remain cut intermediately. The mode of the continuous reinforcing fibers can be, for example, cloth, unidirectional fiber sheet or braid. In view of processability, cloth or unidirectional fiber sheet can be suitably used. Any one of these modes can be used alone or two or more of them can also be used together. Above all, a sheet with multifilaments arranged in parallel in one direction is preferred, since strength and stiffness can be obtained more efficiently.

In the case where a sheet containing reinforcing fibers is used as a surface layer base material, it is preferred that the rate of the reinforcing fibers is 20 to 90 vol % in view of moldability and mechanical properties. A more preferred range is 30 to 80 vol %. Meanwhile, in the case where the matrix is a resin, the vol % is measured according to the method described in JIS K 7075-1991 (Fiber Content and Void Content Testing Methods for Carbon Fiber Reinforced Plastics).

The resin used in the resin member 12 is not especially limited, but a thermoplastic resin can be preferably used in view of the preparation of the bonding form by using injection molding, etc.

As the thermoplastic resin used for forming the resin member, any of the abovementioned thermoplastic resins used for forming the plate member can be used. Among them, especially in view of heat resistance and chemicals resistance, polyphenylene sulfide (PPS) can be preferably used, and in view of the appearance and dimensional stability of the molded article, polycarbonate (PC) and polyphenylene ether (PPE) or styrene-based resin can be preferably used. Further, in view of the strength and impact resistance of the molded article, polyamide (PA) can be preferably used.

For obtaining a molded composite article having higher strength and higher stiffness, it is also preferred to use a resin containing reinforcing fibers as the resin of the resin member 12. As the reinforcing fibers, the abovementioned reinforcing fibers can be enumerated. In the case where the resin member 12 requires radio wave transmission, it is also preferred to use non-conductive glass fibers as the reinforcing fibers.

As the soft material forming the core layer base material 16 of the plate member 11, for example, a porous material such as foam or honeycomb material, fiber sheet or resin sheet can be used. If foam and/or a honeycomb material is used, a plate member 11 having a lighter weight can be obtained.

The material of the soft material is not especially limited. In the case where the soft material is a thermoplastic resin, any of the abovementioned thermoplastic resins used for forming the plate member can be used. Among them, especially in view of lighter weight, a polyolefin-based resin such as polypropylene (PP) or polyethylene (PE) can be preferably used, and in view of the adhesion between the respective surface layer base materials 15a and 15b and the resin member 12, a polyamide-based resin, polyester-based resin, polyvinyl alcohol-based resin, modified polyolefin, or a copolymer or polymer alloy thereof can be preferably used.

In the case where it is desired to let the core layer base material 16 have some stiffness, the soft material may also contain reinforcing fibers such as glass fibers or carbon fibers.

The method for bonding the respective surface layer base materials 15a and 15b and the core layer base material 16 to each other is not especially limited. An adhesive nonwoven fabric, film or the like may be interposed between each of the surface layer base materials and the core layer base material, for bonding, or either or both of the base materials may also be coated with an adhesive for bonding.

The molded composite article of the invention can be applied, for example, to the components of the housings of electric and electronic devices such as personal computers, displays, OA devices, cell phones, portable information terminals, facsimiles, compact disc players, portable MD players, portable radio cassettes, PDA (portable information terminals such as electronic organizers), digital video cameras, digital still cameras, optical devices, audio devices, air conditioners, illumination devices, amusement articles, toys and other household electric appliances. Further, it can also be applied to components of trays, chassis and cases, components of various mechanical parts, and components of electric equipment members and internal parts of automobiles and aircraft.

Above all, the molded composite article of the invention can be suitably used as the components of the housings of electric and electronic devices since the molded composite article has a light weight, high strength, high stiffness and thin wall. Further, it can be suitably used as the components of the housings of notebook personal computers and portable information terminals requiring thin-walled wide displays.

Depending on applications, it is preferred that the molded composite article of the invention has flame retardancy. It is preferred that the flame retardancy of the plate member 11 and the resin member 12 in a vertical flame test based on UL-94 standard is V-1 or V-0 when a specimen having a thickness of 0.1 to 3.0 mm is used. More preferred is V-1 or V-0 when a specimen having a thickness of 0.1 to 1.0 mm is used.

It is preferred that the plate member 11 and/or the resin member 12 contains a flame retarder. Examples of the flame retarder include halogen compounds, antimony compounds, phosphorus compounds, nitrogen compounds, silicone compounds, fluorine compounds, phenol compounds and metal hydroxides. Among them, in view of inhibiting environmental load, a phosphorus-based flame retarder is preferred. Examples of the phosphorus-based flame retarder include phosphorus-containing compounds such as phosphoric esters, condensed phosphoric acid esters and phosphaphenanthrene-based compounds, and red phosphorus. Among them, since red phosphorus is large in the phosphorus atom content functioning to impart flame retardancy, the amount of red phosphorus added as a flame retarder for obtaining a sufficient flame retardant effect can be small.

Further, the resin used for the plate member 11 and the resin member 12 may also contain a filler and other additives to such an extent that the object of the invention is not impaired. Examples of the filler and other additives include an inorganic filler, electrically conducting agent, crystal nucleating agent, ultraviolet light absorber, antioxidant, vibration damper, antimicrobial agent, insecticide, deodorant, coloration preventive, thermal stabilizer, releasing agent, antistatic agent, hydrophilizing agent, plasticizer, lubricant, colorant, pigment, dye, foaming agent, foam stabilizer and coupling agent.

EXAMPLES

Particular examples of the invention are explained below.
Methods for evaluating the properties in the examples:
(1) Tensile Cracking Load
A test was performed using the following tester and specimens under the following conditions.
Name of tester: Precision universal tester (Autograph produced by Shimadzu Corporation)
Specimens: 40 mm wide×50 mm long specimens were cut out of the joint between the plate member 11 and the resin member 12.
Inter-chuck interval: 30 mm
Cross-head speed: 1.6 mm/min
(2) Joint Warping
To the region from the vertical wall 19 (see FIG. 1) of the resin member 12 to the joint with the plate member 11, an L-square rule of stainless steel was applied at right angles, and a thickness gauge was inserted into the clearance between the stainless steel rule and the surface of the joint, to confirm whether or not there was a clearance and to measure the dimension of the clearance, i.e., the joint warping. The value of the largest warping among samples was employed as joint warping.
(3) Length of the Actual Bonding Line Per 1 Mm of Projection-Connecting Line
The length of the recurring undulation units at the undulating bonding interface of the molded composite article 10 obtained by injection molding was obtained by measuring using a rule and by calculation. In the case where there was a roundish line segment in the profile line of the undulation form, the radius or diameter of the roundness was measured, and the formula for obtaining the circumference from the value was used to calculate the length of the actual bonding line. The total of the lengths of the recurring undulation units of the bonding line was divided by the length of the straight projection-connecting line, i.e., by the parallel direction length, to obtain the length of the actual bonding line per 1 mm length of the projection-connecting line, i.e., per 1 mm parallel direction length.
(4) Number of Projections Per 100 Mm Length of Projection-Connecting Line
The length of the recurring undulation units at the undulating bonding interface of the molded composite article 10 obtained by injection molding was obtained by measuring using a rule and by calculation. In the case where there was a roundish line segment in the profile line of the undulation form, the radius or diameter of the roundness was measured, and the formula for obtaining the circumference from the value was used to calculate the length of the actual bonding line. Since one projection existed every recurring undulation unit, the length of the projection-connecting line per recurring unit was measured using a rule, and 100 mm was divided by the length of the projection-connecting line per recurring unit, to obtain the number of projections per 100 mm length of the projection-connecting line.
(5) Recess Depth Ln
The depth of a recess of the molded composite article 10 obtained by injection molding was measured using a rule.
(6) Recess Opening Width Fn
The opening width of a recess of the molded composite article 10 obtained by injection molding was measured using a rule.
(7) Value of Ln/Fn
This value was obtained by calculation from the above-mentioned measured values of (5) and (6).

Example 1

As the surface layer base materials of the plate member 11, two laminates, each comprising two unidirectional carbon fiber prepreg sheets (UD PP) P3052S-12 [carbon fiber T700S (strength 4900 MPa, elastic modulus 230 GPa, carbon fiber weight content 67 wt %, base resin: epoxy resin) produced by Toray Industries, Inc.] laminated on each other with their fiber directions kept perpendicular to each other, were prepared, and one of the laminates was used as the surface layer base material 15a of the upper surface side, while the other laminate was used as the surface layer base material 15b of the lower surface side. As the core layer base material 16, foam [product number RC2010 of EFSEL, registered trademark, produced by Furukawa Electric Co., Ltd.] (twice-expanded polypropylene) was prepared.

On each of the upper and lower surfaces of the prepared core layer base material 16, an adhesive polyolefin nonwoven fabric (melting point 150° C., unit weight per area 15 g/m$^2$ produced by Japan Vilene Company) was placed, and further on the upper and lower surfaces of the laminate, the prepared surface layer base materials 15a and 15b were placed. The laminate was then press-molded (mold temperature 160° C., pressure 6 MPa, preheating time 5 minutes, curing time 30 minutes), to obtain a plate-like body. The obtained plate-like body was processed to have a size of 300 mm×230 mm and NC-machined to form the undulating bonding interface shown in Example 1 of Table 1 and FIG. 6 at the side end of the obtained plate-like body, to prepare a plate member 11.

The plate member 11 was set in an injection molding mold, and the mold was clamped. Fiber-reinforced copolymerized polyamide resin CM3511-G60 (glass fiber content 60 wt %, produced by Toray Industries, Inc.) as the resin to be formed into a resin member 12 was injection-molded to produce a molded composite article 10 as shown in FIG. 1, in which the side end on the side opposite to the vertical wall 19 of the resin member 12 having the vertical wall 19 penetrated into the undulation form of the plate member 11, to ensure that the resin member 12 might be bonded to the plate member 11 via the undulating boding interface 13JF. In the molded composite article 10, the thickness of the resin member 12 in the region from the vertical wall 19 to the undulating bonding interface 13JF was 1.5 mm, and the width of the resin member 12 along the left edge 10E was 30 mm.

Example 2

Figure 7:
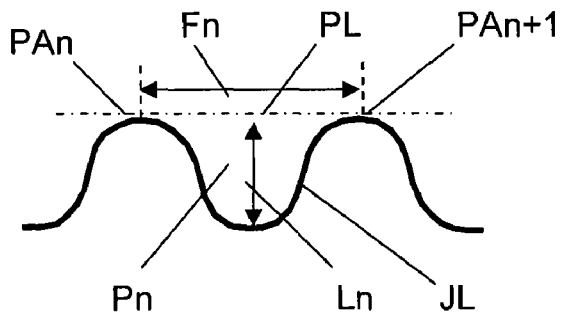
FIG. 7 is a plan view showing another example of the undulating bonding interface in the molded composite article of the invention.

A molded composite article was prepared according to the same method as described in Example 1, except that the undulating bonding interface shown in Example 2 of Table 1 and FIG. 7 was formed by NC machining in the plate-like body of Example 1.

Example 3

A molded composite article was prepared according to the same method as described in Example 1, except that the undulating bonding interface shown in Example 3 of Table 1 and FIG. 7 was formed by NC machining in the plate-like body of Example 1.

Example 4

Figure 8:
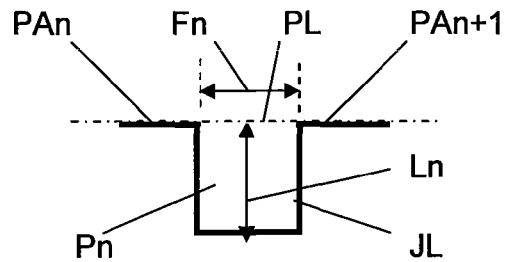
FIG. 8 is a plan view showing a further example of the undulating bonding interface in the molded composite article of the invention.

A molded composite article was prepared according to the same method as described in Example 1, except that the undulating bonding interface shown in Example 4 of Table 2 and FIG. 8 was formed by NC machining in the plate-like body of Example 1.

Example 5

Figure 9:
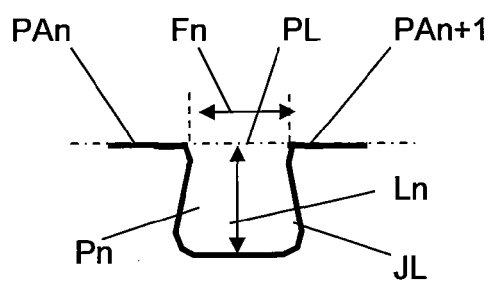
FIG. 9 is a plan view showing a still further example of the undulating bonding interface in the molded composite article of the invention.

A molded composite article was prepared according to the same method as described in Example 1, except that the undulating bonding interface shown in Example 5 of Table 2 and FIG. 9 was formed by NC machining in the plate-like body of Example 1.

Comparative Example 1

A molded composite article 50 shown in FIG. 5 was prepared according to the same method as described in Example 1, except that the straight bonding interface shown in Comparative Example 1 of Table 3 was formed by NC machining in the plate-like body of Example 1.

Comparative Example 2

As the surface layer boards of the plate member 101 (see FIG. 4), two laminates, each comprising two unidirectional carbon fiber prepreg sheets (UD PP) P3052S-12 [carbon fiber T700S (strength 4900 MPa, elastic modulus 230 GPa, carbon fiber weight content 67 wt %, base resin: epoxy resin) produced by Toray Industries, Inc.] laminated on each other with their fiber directions kept perpendicular to each other, were prepared, and one of the laminates was used as the surface layer base material 105a of the upper surface side, while the other laminate was used as the surface layer base material 105b of the lower surface side. As the core layer base material 106, foam [product number RC2010 of EFSEL, registered trademark, produced by Furukawa Electric Co., Ltd.] was prepared.

On each of the upper and lower surfaces of the prepared core layer base material 106, an adhesive polyolefin nonwoven fabric (melting point 150° C., unit weight per area 15 g/m$^2$ produced by Japan Vilene Company) was placed, and further on the upper and lower surfaces of the laminate, the prepared surface layer base materials 105a and 105b were placed, to prepare a crude laminate destined to be a plate member 101.

Further, separately, a molded resin article destined to be a resin member 102 was prepared. The molded resin article had an overlapping portion (bonding projection 107) (3 mm wide, 1 mm thick) to be mounted with the end of the plate member 101.

On the upper surface of the overlapping portion, an adhesive copolymerized nylon nonwoven fabric (melting point 150° C., unit weight per area 40 g/m$^2$ produced by Japan Vilene Company) was placed, and the crude laminate and the molded resin article were press-molded (mold temperature 160° C., pressure 6 MPa, preheating time 5 minutes, curing time 30 minutes), to produce a molded composite article. A molded composite article 40 shown in FIG. 4 was prepared according to the same method as in Example 1, except that the molded composite article was processed to have a size of 300 mm×230 mm and NC-machined to form a straight bonding interface shown in Comparative Example 2 of Table 3.

The tensile cracking loads of the molded composite articles of Examples 1 through 5 were measured, and it was confirmed that sufficient bonding strengths were obtained. The molded composite articles did not have a joint at which the plate member and the resin member overlapped on each other, and therefore could have a thinner wall accordingly. On the other hand, in the molded composite article of Comparative Example 1, a sufficient tensile cracking load could not be obtained, and the joint warping was also large. In the molded composite article of Comparative Example 2, the tensile cracking load was sufficient, but owing to the existence of the overlapping portion, a thin wall could not be achieved.

Meanings of the respective items in Tables 1 through 3:
Item 1: Material of fibers
Item 2: Base resin
Item 3: Material of foam
Item 4: Material of fibers
Item 5: Base resin
Item 6: Form of recess Pn
Item 7: Whether or not a roundish line segment existed in a profile line of the recess form of recess Pn
Item 8: Length of the actual bonding line per 1 mm length of projection-connecting line PL (in mm)
Item 9: Number of projections per 100 mm length of projection-connecting line PL
Item 10: Recess depth Ln (in mm)
Item 11: Recess opening width Fn (in mm)
Item 12: Value of Ln/Fn
Item 13: Whether or not there was an overlapping portion between the plate member and the resin member
Item 14: Tensile cracking load (in N)
Item 15: Value of joint warping (in mm)

TABLE 1

Figure 6:
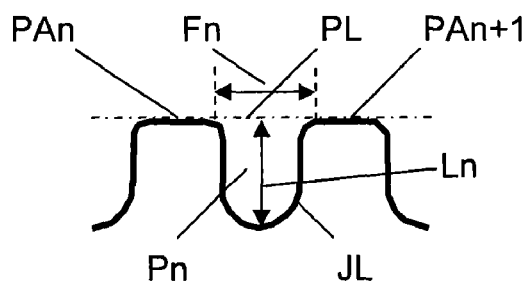
FIG. 6 is a plan view showing an example of the undulating bonding interface in the molded composite article of the invention.

|  |  | Example 1 | Example 2 | Example 3 |
|---|---|---|---|---|
| Surface layer base material | Item 1 | Carbon fibers | Carbon fibers | Carbon fibers |
|  | Item 2 | Epoxy-based | Epoxy-based | Epoxy-based |
| Core layer base material | Item 3 | Polypropylene | Polypropylene | Polypropylene |
| Resin member | Item 4 | Glass fibers | Glass fibers | Glass fibers |
|  | Item 5 | Polyamide-based | Polyamide-based | Polyamide-based |
|  | Item 6 | FIG. 6 | FIG. 7 | FIG. 7 |
|  | Item 7 | Yes | Yes | Yes |
|  | Item 8 | 1.97 | 1.57 | 1.57 |
|  | Item 9 | 7.7 | 50.0 | 5.0 |
|  | Item 10 | 8.0 | 1.0 | 10.0 |
|  | Item 11 | 8.0 | 2.0 | 20.0 |
|  | Item 12 | 1.0 | 0.5 | 0.5 |
|  | Item 13 | No | No | No |
| Mechanical strength | Item 14 | 1,300 | 700 | 1,250 |
| Joint warping | Item 15 | 0.1 | 0.1 | 0.2 |
|  | Item 12 | 1.0 | 0.5 | 0.5 |
|  | Item 13 | No | No | No |
| Mechanical strength | Item 14 | 1,300 | 700 | 1,250 |
| Joint warping | Item 15 | 0.1 | 0.1 | 0.2 |

TABLE 2

|  |  | Example 4 | Example 5 |
|---|---|---|---|
| Surface layer base material | Item 1 | Carbon fibers | Carbon fibers |
|  | Item 2 | Epoxy-based | Epoxy-based |
| Core layer base material | Item 3 | Polypropylene | Polypropylene |
| Resin member | Item 4 | Glass fibers | Glass fibers |
|  | Item 5 | Polyamide-based | Polyamide-based |
|  | Item 6 | FIG. 8 | FIG. 9 |
|  | Item 7 | No | Yes |
|  | Item 8 | 1.10 | 2.09 |
|  | Item 9 | 5.0 | 7.7 |
|  | Item 10 | 1.0 | 8.0 |
|  | Item 11 | 1.0 | 8.0 |
|  | Item 12 | 1.0 | 1.0 |
|  | Item 13 | No | No |
| Mechanical strength | Item 14 | 750 | 1,800 |
| Joint warping | Item 15 | 0.1 | 0.1 |

TABLE 3

|  |  | Comparative Example 1 | Comparative Example 2 |
|---|---|---|---|
| Surface layer base material | Item 1 | Carbon fibers | Carbon fibers |
|  | Item 2 | Epoxy-based | Epoxy-based |
| Core layer base material | Item 3 | Polypropylene | Polypropylene |
| Resin member | Item 4 | Glass fibers | Glass fibers |
|  | Item 5 | Polyamide-based | Polyamide-based |
|  | Item 6 | Straight line | Straight line |
|  | Item 7 | — | — |
|  | Item 8 | 1.00 | 1.00 |
|  | Item 9 | 0 | 0 |
|  | Item 10 | 0 | 0 |
|  | Item 11 | — | — |
|  | Item 12 | — | — |
|  | Item 13 | No | Yes |
| Mechanical strength | Item 14 | 400 | 1,200 |
| Joint warping | Item 15 | 0.6 | 0 |

The molded composite article in one aspect of the invention can be suitably used as components of the housings of electric and electronic devices such as notebook personal computers and cell phones, and further suitably used also as components of automobile parts since the molded composite article has a light weight, high strength, high stiffness and thin wall.

The invention claimed is:

1. A molded composite article comprising a plate member and a resin member and having a bonding interface at which the plate member and the resin member are bonded to each other at side end faces thereof facing each other, in which the plate member comprises surface layer base materials positioned on an upper surface side and a lower surface side of the plate member and a core layer base material positioned between the surface layer base materials; and the respective surface layer base materials are each formed of a fiber-reinforced resin, while the core layer base material is formed of a material that is softer than the fiber-reinforced resin forming the respective surface layer base materials, wherein at least a partial bonding interface of the bonding interface is an undulating bonding interface at which undulating side end faces of the respective surface layer base materials and an undulating side end face of the resin member are bonded to each other; a length of an actual bonding line formed along an undulation of the undulating bonding interface is 1.05 mm or more per 1 mm length of a projection-connecting line consisting of straight line segments connecting crests of the respective projections adjacent to each other in an undulation form of the respective surface layer base materials; and at the undulating bonding interface, the resin member has a resin member penetrating tip portion that penetrates into a region between both of the surface layer base materials; wherein the plate member and the resin member are bonded integrally to each other at the bonding interface such that undulating side end faces of the respective surface layer base materials and an undulating side end face of the resin member are integrally bonded to each other.

2. The molded composite article according to claim 1, wherein at least at the undulating bonding interface, the side end face of the resin member is formed to be flat excluding the resin member penetrating tip portion.

3. The molded composite article according to claim 1, wherein at least at the undulating bonding interface, the thickness of the plate member is substantially equal to the thickness of the resin member.

4. The molded composite article according to claim 1, wherein the thickness of the plate member is 0.7 to 1.5 mm.

5. The molded composite article according to claim 1, wherein at the undulating bonding interface, the number of the projections in the undulation form of the respective surface layer base materials is 1 to 100 per 100 mm length of the projection-connecting line.

6. The molded composite article according to claim 1, wherein at the undulating bonding interface, if the distance from the projection-connecting line to a recess bottom of each of recesses Pn in the undulation form of the respective surface layer base materials is a recess depth Ln, and the distance between both the ends of a recess opening line of the recess Pn formed as a line segment of the projection-connecting line within a form of the recess is a recess opening width Fn, then the recess depth Ln is 0.1 to 10 times the recess opening width Fn.

7. The molded composite article according to claim 6, wherein the recess Pn contains a roundish line segment in the profile line of the recess form.

8. The molded composite article according to claim 6, wherein the recess Pn has a portion wider than the recess opening width Fn.

9. The molded composite article according to claim 6, wherein the form of the recess Pn is substantially polygonal.

10. The molded composite article according to claim 1, wherein reinforcing fibers in the fiber-reinforced resin forming the respective surface layer base materials are carbon fibers.

11. The molded composite article according to claim 1, wherein a matrix resin in the fiber-reinforced resin forming the respective surface layer base materials is a resin containing a thermosetting resin.

12. The molded composite article according to claim 1, wherein the material forming the core layer base material is at least one material selected from the group consisting of foams, honeycomb materials, fiber sheets and resin sheets.

13. The molded composite article according to claim 1, wherein the resin member is formed of a fiber-reinforced resin.

14. The molded composite article according to claim 13, wherein reinforcing fibers in the fiber-reinforced resin forming the resin member are glass fibers or carbon fibers.

15. A process for producing a molded composite article as set forth in claim 1 comprising the steps of:

(a) preparing a plate member having an undulation form formed at one side end face of a plate-like body comprising surface layer base materials formed of a fiber-reinforced resin and positioned on an upper surface side and a lower surface side and a core layer base material formed of a material softer than the fiber-reinforced resin and positioned between both of the surface layer base materials, by forming multiple grooves at the end face inward into the surface layer base materials, (b) accommodating the prepared plate member in a mold of an injection molding machine, and (c) injecting a resin at least toward the end face having an undulation form of the plate member in the injection molding machine having the plate member accommodated in the mold, to ensure that the resin can be bonded to the end face having the undulation form of the plate member and that the resin can penetrate into a region between both of the surface layer base materials.

16. The process for producing a molded composite article according to claim 15, wherein in the injecting step, the resin is injected to ensure that the thickness of the plate member and the thickness of the resin member can be substantially equal to each other after completion of molding at least at a joint having the undulation form between the plate member and the resin bonded thereto.

* * * * *